United States Patent [19]
Zarowin

[11] 3,720,877
[45] March 13, 1973

[54] METAL VAPOR DISCHARGE TUBE USING METAL AND SEMI-METAL COMPOUNDS IN A DISCHARGE TUBE

[75] Inventor: Charles B. Zarowin, Tarrytown, N.Y.

[73] Assignee: International Business Machines Corporation, Armonk, N.Y.

[22] Filed: Sept. 25, 1970

[21] Appl. No.: 75,589

[52] U.S. Cl. .................................. 330/4.3, 331/94.5
[51] Int. Cl. ............................................. H01s 3/09
[58] Field of Search .................. 331/94.5; 330/4.3

[56]  References Cited

UNITED STATES PATENTS

| | | | |
|---|---|---|---|
| 3,484,720 | 12/1969 | Walter | 331/94.5 |
| 3,464,028 | 8/1969 | Moeller | 331/94.5 |
| 3,411,105 | 11/1968 | Patel | 331/94.5 |
| 3,411,106 | 11/1968 | Friedl | 331/94.5 |

OTHER PUBLICATIONS

Fraford, "High Peak Power Pulsed $10\mu$CO Laser" 12/28/65, pg. 384-385, Physics Letters, Vol. 20, No. 4.
Carfare, "Continuous Operation of a Long Lived CO Laser Tube", 3/68, pg. 102-103, IEEE JQE.

*Primary Examiner*—Benjamin A. Borchelt
*Assistant Examiner*—N. Moskowitz
*Attorney*—Hanifin and Jancin and John J. Goodwin

[57]  ABSTRACT

A metal vapor discharge tube device including a discharge tube and means for introducing a metal or semi-metal into the discharge tube without auxiliary heating. The metal or semi-metal is introduced as a compound of a metal or semi-metal and a non-metallic radical having a vapor pressure greater than one torr at the temperature of the discharge tube (which for most discharge tubes can be as high as about 300° C). The discharge in the tube causes the decomposition of the compound, thereby releasing the metal or semi-metal into the discharge for excitation. If desired, the excitation can produce lasing and the device may be used as a metal vapor laser.

3 Claims, 1 Drawing Figure

PATENTED MAR 13 1973 3,720,877
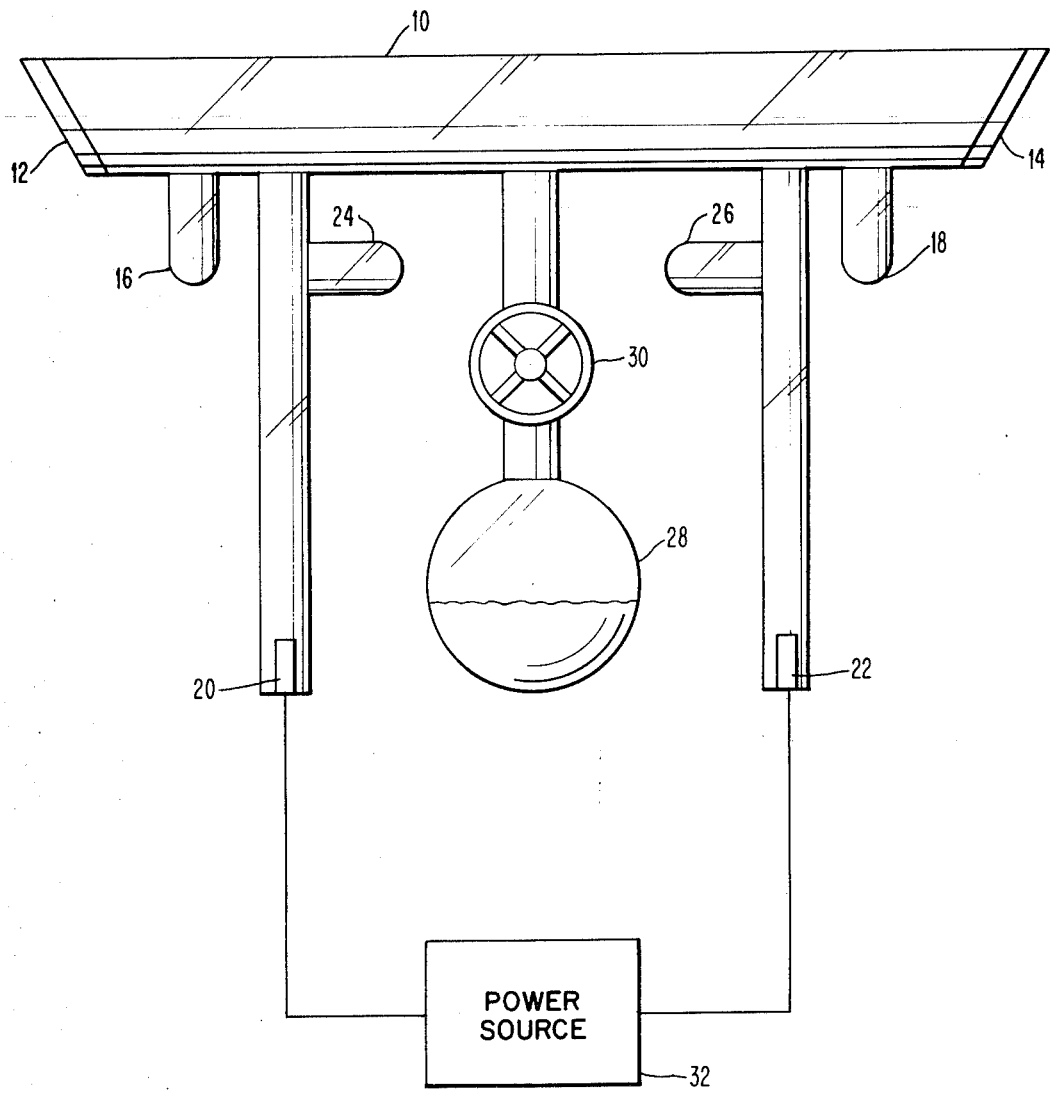
INVENTOR
CHARLES B. ZAROWIN
BY John J. Goodwin
ATTORNEY

METAL VAPOR DISCHARGE TUBE USING METAL AND SEMI-METAL COMPOUNDS IN A DISCHARGE TUBE

BACKGROUND OF THE INVENTION

1. Field of the Invention

The present invention is in the metal vapor discharge tube and laser technology.

2. Prior Art

Metal vapor lasers are known in the prior art wherein pure metal vapor is introduced into the discharge tube by auxiliary heating of the metal. The present invention is distinct over the prior art in that a metal or semi-metal compound is introduced into the discharge tube in a gaseous state without auxiliary heating as a consequence of the high vapor pressure of the compound compared to the pure metal or semi-metal. In the discharge tube, the compound decomposes into the metal or semi-metal and the non-metallic radical. The metal is thus made available for use in the discharge tube. The present invention therefore permits the use of high melting point metals or semi-metals in a discharge tube whereas in the prior art the use of such metals or semi-metals was impossible or impractical due to the extreme heat required.

SUMMARY OF THE INVENTION

An object of the present invention is to provide a metal vapor discharge tube using metals and semi-metals having relatively high melting points.

Another object of the present invention is to provide a metal vapor discharge tube using metals or semi-metals without auxiliary heating through the use of metal or semi-metal compounds having vapor pressures greater than one torr at temperatures up to about 300°C.

A further object of the present invention is to provide a system and method wherein metal or semi-metal compounds are introduced into a discharge tube in the vapor state without auxiliary heating wherein the compound decomposes into metal and the non-metallic radical.

Still another object of the present invention is to provide a metal vapor laser wherein metals or semi-metals are introduced into a discharge tube as vapor compounds.

The foregoing and other objects, features and advantages of the invention will be apparent from the following more particular description of a preferred embodiment of the invention, as illustrated in the accompanying drawing.

The drawing is a schematic illustration of an embodiment of a metal vapor discharge tube according to the principles of the present invention.

Metal vapor lasers are useful devices that have advantages over other type lasers such as rare gas lasers. Since electrons are not as tightly bound to metal atoms as to non-metallic atoms, a laser employing a metal vapor in the active medium can be brought into the excited state using lower energy levels than that required for other type lasers. Heretofore, a pure metal in a solid state was placed in a discharge tube and heated in order to convert some fraction of it into the vapor state in the tube. There are a large number of metals having melting points that are too high to provide sufficient vapor pressure in a discharge tube at practical temperatures. For example, Molybdenum (Mo) has a melting point of 2,620° C, Ruthenium (Ru) is 1,950° C, Osmium (Os) is 2,500° C and Tungsten (W) is 3,030°. Thus, only the low melting point metals which have sufficient vapor pressure at low temperature can be used in metal vapor lasers. The present invention provides a way in which metals such as molybdenum, ruthenium, osmium, tungsten and other high melting point metals and semi-metals can be employed in the vapor state in metal vapor discharge tubes or lasers without auxiliary heating.

In the present invention the metal or semi-metal is introduced into the discharge tube as a compound having a vapor pressure greater than approximately one torr at the temperature of the discharge tube (as high as about 300°C). Thus at this temperature or above, some of the compound is in the vapor or gaseous state. In the discharge tube the discharge provides energy which causes decomposition of the compound and thereby provides the atomic species of the metal available for excitation.

MOre particularly, consider a compound composed of a metal or semi-metal M and a non-metallic radical X, the compound being represented by $MX_n$. In the discharge the following reaction occurs:

$$MX_n \rightleftarrows M + n/2(X_2)$$

The reaction is reversible which means the metal or semi-metal and the non-metallic radical will recombine in the tube to form the compound. Thus, there will be a constant decomposition and recombination process occurring in the discharge tube so that metal or semi-metal molecules will be available in sufficient concentration for excitation at all times. The excitation and consequent relaxation of the metal or semi-metal atoms produce the emission of light (lasing).

Referring to the drawing, a schematic representation of a discharge tube is shown. The tube 10 may include reflectors 12 and 14 at the Brewster angle so that emitted light may be coupled out of the tube. Conventional vapor traps 16 and 18 may also be included to maintain the vapor in the desired region. The tube initially contains a rare gas, for example argon, krypton, helium, etc. Electrodes 20 and 22 and power source 32 are provided to excite the gas to provide an electrical discharge. The electrode regions may also be isolated by vapor traps 24 and 26. The discharge tube shown in the drawing is only representative, the present invention may be practiced with other known discharge tubes, for example electrodeless tubes which employ capacitive or inductive excitation.

A compound of a metal or semi-metal and a non-metallic radical is contained in vessel 28 which is connected to tube 10 through a valve 30. The compound in vessel 28 has a vapor pressure greater than approximately one torr at the temperature of the discharge tube (approximately 300°C) so that the compound will be in the vapor state as a result of the heat produced by the discharge. When valve 30 is opened, the compound will enter discharge tube 10 and the discharge will cause excitation of the compound (and in the case of some compounds, cause ionization) which will cause decomposition. That is, the hot electrons in the discharge collide with the molecules of the compound and cause decomposition. After decomposition the metal molecules and the non-metallic radical molecules will recombine upon collision, however, the discharge will continue to cause decomposition and a state of equilibrium will be reached and there will be a concentration of metal vapor which will be excited into the lasing condition.

It was previously stated that the compounds that are employed in the present invention are those consisting of a metal or semi-metal and a non-metallic radical having a vapor pressure greater than torr at the operating temperature of the discharge tube which can be as high as about 300°C.

Examples of some compounds which may be employed in the present invention are listed below.

| Name | Formula |
|---|---|
| Aluminum bromide | $AlBr_3$ |
| Aluminum chloride | $AlCl_3$ |
| Aluminum iodide | $AlI_3$ |
| Antimony tribromide | $SbBr_3$ |
| Antimony trichloride | $SbCl_3$ |
| Antimony pentachloride | $SbCl_5$ |
| Antimony triiodide | $SbI_3$ |
| Antimony pentiodide | $SbI_5$ |
| Arsenic tribromide | $AsBr_3$ |
| Arsenic trichloride | $AsCl_3$ |
| Arsenic pentafluoride | $AsF_5$ |
| Arsenic hydride (arsine) | $AsH_3$ |
| Arsenic trioxide | $As_2O_3$ |
| Beryllium borohydride | $BeB_2H_8$ |
| Beryllium bromide | $BeBr$ |
| Beryllium chloride | $BeCl_2$ |
| Beryllium iodide | $BeI_2$ |
| Borine carbonyl | $BH_3CO$ |
| Boron tribromide | $BBr_3$ |
| Boron trichloride | $BCl_3$ |
| Boron trifluoride | $BF_3$ |
| Dihydrodiborane | $B_2H_6$ |
| Diborane hydrobromide | $B_2BrH_5$ |
| Triborine triamine | $B_3H_6N_3$ |
| Tetrahydrotetraborane | $B_4H_{10}$ |
| Tetrahydropentaborane | $B_5H_{11}$ |
| Dihydrodecaborane | $B_{10}H_{14}$ |
| Bromine pentafluoride | $BrF_5$ |
| Carbon tetrachloride | $CCl_4$ |
| Carbon tetrafluoride | $CF_4$ |
| Carbon dioxide | $CO_2$ |
| Carbon suboxide | $C_3O_2$ |
| Carbon disulfide | $CS_2$ |
| Carbon subsulfide | $C_3S_2$ |
| Carbon selenosulfide | $CSSe$ |
| Carbon monoxide | $CO$ |
| Carbonyl chloride | $COCl_2$ |
| Carbonyl selenide | $COSe$ |
| Carbonyl sulfide | $COS$ |
| Chromium carbonyl | $Cr(CO)_6$ |
| Chromyl chloride | $CrO_2Cl_2$ |
| Ferric chloride | $FeCl_2$ |
| Gallium trichloride | $GaCl_3$ |
| Germanium hydride | $GeH_4$ |
| Germanium bromide | $GeBr_4$ |
| Germanium chloride | $GeCl_4$ |
| Trichlorogermane | $GeHCl_3$ |
| Tetramethylgermanium | $Ge(CH_3)_4$ |
| Digermane | $Ge_2H_6$ |
| Trigermane | $Ge_3H_8$ |
| Iodine pentafluoride | $IF_5$ |
| Iodine heptafluoride | $IF_7$ |
| Iron pentacarbonyl | $Fe(CO)_5$ |
| Mercuric bromide | $HgBr_2$ |
| Mercuric chloride | $HgCl_2$ |
| Mercuric iodide | $HgI_2$ |
| Molybdenum hexafluoride | $MoF_6$ |
| Nickel carbonyl | $Ni(CO)_4$ |
| Phosphorous tribromide | $PBr_3$ |
| Phosphorous trichloride | $PCl_3$ |
| Phosphorous pentachloride | $PCl_5$ |
| Phosphorous thiobromide | $PSBr_3$ |
| Phosphorous thiochloride | $PSCl_3$ |
| Selenium dioxide | $SeO_2$ |
| Selenium hexafluoride | $SeF_6$ |
| Selenium oxychloride | $SeOCl_2$ |
| Selenium tetrachloride | $SeCl_4$ |
| Silicon tetrafluoride | $SiF_4$ |
| Bromosilane | $SiH_3Br$ |
| Chlorosilane | $SiH_3Cl$ |
| Fluorosilane | $SiH_3F$ |
| Iodosilane | $SiH_3I$ |
| Bromodichlorofluorosilane | $SiBrCl_2F$ |
| Chlorotrifluorosilane | $SiClF_3$ |
| Dibromochlorofluorosilane | $SiBr_2ClF$ |
| Dibromosilane | $SiH_2Br_2$ |
| Dichlorodifluorosilane | $SiCl_2F_2$ |
| Difluorosilane | $SiH_2F_2$ |
| Disilane | $Si_2H_6$ |
| Disiloxane | $(SiH_3)_2O$ |
| Fluorotrichlorosilane | $SiCl_3F$ |
| Hexachlorodisilane | $Si_2Cl_6$ |
| Hexafluorodisilane | $Si_2F_6$ |
| Octachlorotrisilane | $Si_3Cl_8$ |
| Tetrasilane | $Si_4H_{10}$ |
| Tribromofluorosilane | $SiBr_3F$ |
| Tribromosilane | $SiHBr_3$ |
| Trichlorosilane | $SiHCl_3$ |
| Trifluorosilane | $SiHF_3$ |
| Trisilane | $Si_3H_8$ |
| Disilazane | $(SiH_3)_3N$ |
| Sulfur hexafluoride | $SF_6$ |
| Sulfur dioxide | $SO_2$ |
| Sulfur monochloride | $S_2Cl_2$ |
| Sulfur trioxide ($\alpha$) | $SO_3$ |
| Sulfur trioxide ($\beta$) | $SO_3$ |
| Sulfur trioxide ($\gamma$) | $SO_3$ |
| Thionyl bromide | $SOBr_2$ |
| Thionyl chloride | $SOCl_2$ |
| Tantalum pentafluoride | $TaF_5$ |
| Tellurium tetrachloride | $TeCl_4$ |
| Tellurium hexafluoride | $TeF_6$ |
| Titanium tetrachloride | $TiCl_4$ |
| Tungsten hexafluoride | $WF_6$ |
| Uranium hexafluoride | $UF_6$ |
| Vanadyl trichloride | $VOCl_3$ |
| Zirconium tetrabromide | $ZrBr_4$ |
| Zirconium tetrachloride | $ZrCl_4$ |
| Zirconium tetraciodide | $ZrI_4$ |

The above list is representative of compounds having vapor pressure greater than approximately one torr at 300°C. A person having ordinary skill in the art could look up other compounds using a chemical handbook. A very extensive list is provided by Daniel R. Stull in Industrial and Engineering Chemistry, 39, 517 (1947).

What has been described is a metal vapor laser wherein metals with very high melting points can be employed whereas heretofore the use of such metals was impractical or impossible.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A metal vapor discharge tube device comprising:
a discharge tube containing a gas,
means for exciting said gas in said tube to produce an electrical discharge in said tube, said electrical discharge causing said discharge tube to operate at a given temperature, and
means for introducing a compound of a metal or semi-metal and a non-metallic radical into said tube in the vapor state, said compound having a vapor pressure greater than one torr at the operating temperature of said discharge tube during said discharge, wherein said electrical discharge decomposes said metal or semi-metal compound into the metal or semi-metal and the non-metallic radical followed by electron excitation of the metal to produce population inversion, wherein said decomposition occurs without external heating but is due to the operating temperature of the discharge tube.

2. A metal vapor discharge tube device according to claim 1 wherein said gas and said metal or semi-metal in said discharge tube is excited by said excitation means to produce stimulated emission of light.

3. A method for introducing a metal or semi-metal into a discharge tube containing a gas comprising the steps of:
producing an electrical discharge in said gas in said discharge tube, said electrical discharge causing said discharge tube to have an operating temperature, and
introducing a compound of a metal or semi-metal and a non-metallic radical into said discharge tube as a vapor, said compound having a vapor pressure greater than one torr at the operating temperature of said discharge tube during said discharge, wherein said electrical discharge causes said compound to decompose into the metal or semi-metal and the non-metallic radical and produces electron excitation of the metal to produce population inversion, wherein said decomposition occurs without external heating but is due to the operating temperature of the discharge tube.

* * * * *